Aug. 15, 1967
D. BORELLO
3,336,117
PRODUCT OF EXPANDED METAL OR THE LIKE
AND METHOD OF PRODUCING SAME
Filed Dec. 31, 1964
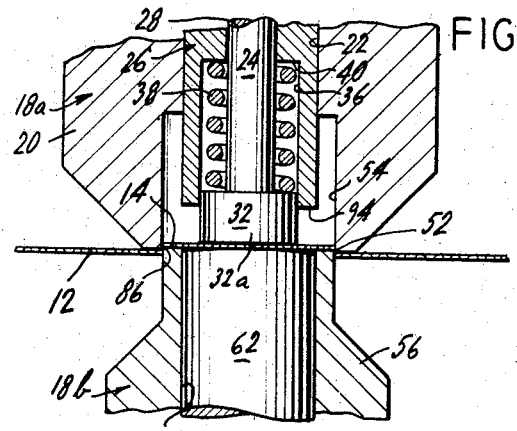
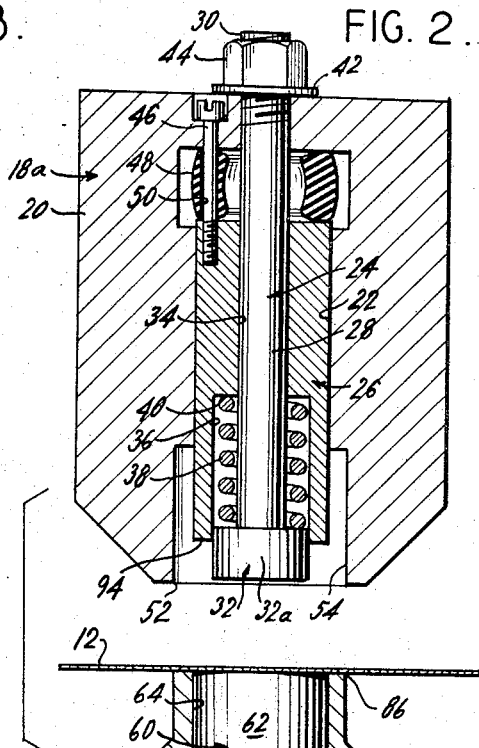
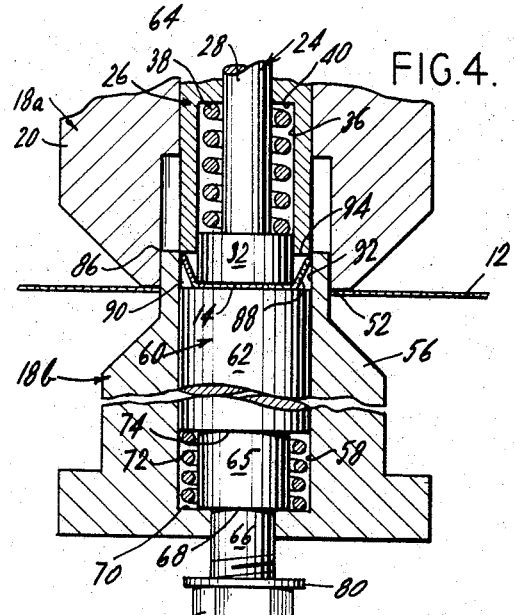
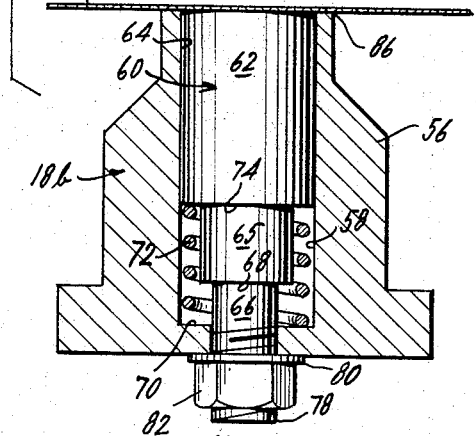
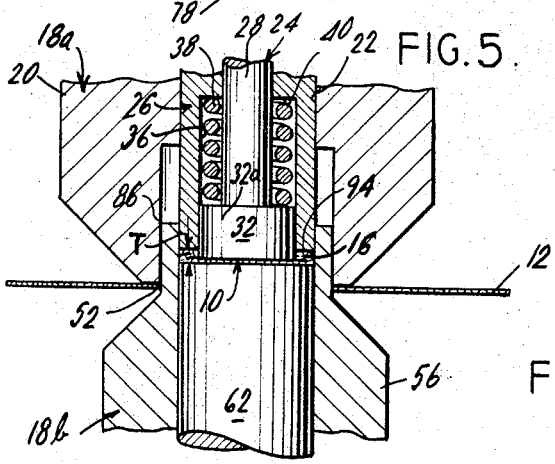
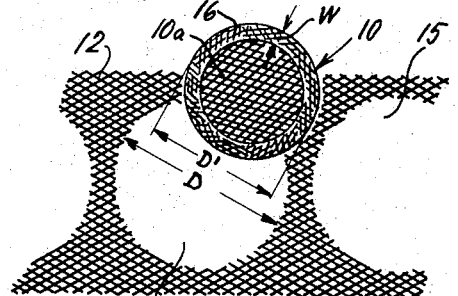
INVENTOR.
DOMENIC BORELLO
BY Amster & Rothstein
ATTORNEYS United States Patent Office 3,336,117
Patented Aug. 15, 1967

3,336,117
PRODUCT OF EXPANDED METAL OR THE LIKE
AND METHOD OF PRODUCING SAME
Domenic Borello, 300 Pelham Road,
New Rochelle, N.Y. 10805
Filed Dec. 31, 1964, Ser. No. 422,790
8 Claims. (Cl. 29—190)

The present invention relates generally to improvements for products fabricated of expanded metal or the like and to an improved method of producing said products, and more particularly relates to an improved finished edge for a product cut from said expanded metal or the like which is free of burrs and otherwise is substantially smooth for ease of handling, and which is also reinforced in strength and rigidity.

Expanded metal, woven or otherwise fabricated wire mesh, and in general other metallic materials which are comprised as a network of metal rather than being solid throughout, are particularly suitable materials for fabricating a potentially great variety of industrial products for which, for example, said materials have the advantage of being lighter than comparable conventional solid metals. Moreover, these materials are ideally suited for industrial applications which require filtering, straining, or a similar end-use. Since the most widely used of these materials is expanded metal, the discussion which follows will be directed primarily to this form of these materials, but in so doing no limitation whatsoever on the scope of the present invention is intended or is to be implied. A serious drawback to the use of expanded metal in the fabrication of industrial products is the unwieldy nature of the edge which results when this material is cut, said cut edge by virtue of being formed of randomly severed interstices being unavoidably comprised of projecting and uneven metal ends or the like. Being thusly unevenly formed, a typical expanded metal edge, regardless of the care taken in cutting the same, usually renders any product made from this material difficult to handle.

Broadly, it is an object of the present invention to overcome this major objection to the use of expanded metal or the like, and more particularly to provide a product fabricated of expanded metal of the like and also a method of production which results in a greatly improved finished edge which not only facilitates the handling of said product but also structurally reinforces said product.

It is more specifically an object of the present invention to provide an expanded metal product and a method of producing the same which is characterized by the provision on said product of an edge which is continuous, free of burrs or other edge projections, and which has a greater mass than areas of said product adjacent said edge thereby providing said product with greater strength and dimensional stability along said edge.

Still another object of the present invention is to provide a finished edge on a product fabricated from expanded metal or a similarly constituted material for improving the ease of handling and structural characteristics of said product, and for achieving said edge by a method which lends itself to mass production whereby said improved products of expanded metal or the like are economically produced.

A typical industrial product demonstrating features of the present invention is a filter fabricated from a blank die-cut from a supply of expanded metal. As work-in-process, said blank includes a central section and an annular section formed outwardly thereof and terminating in a free edge. In the conversion of the raw cut edge of said work-in-process blank into a finished, smooth edge, said annular section is deformed inwardly in relation to said free edge to provide a reinforced edge about said central section of lesser radial extent than said annular section and of a thickness greater than said central section. The resulting reinforced edge provides a smooth area for handling said filter and also maintains the shape of said filter.

In the conversion of said cut edge to said finished edge, and as is herein described in connection with the method aspects of the present invention, said work-in-process blank after removal from a suitable supply of expanded metal is held inwardly of the free edge of said blank to isolate or delineate said annular section on said blank. Thereafter, a chamber is formed surrounding said blank and simultaneously therewith said annular section is bent out of the plane of said blank and into said chamber. Next, said annular section is crushed upon itself within the confines of said chamber and in the process of being thusly formed any burrs and projections or the like on the edge of said annular section are removed. Additionally, said annular section is condensed into an area of lesser radial extent and one having a greater mass, and thereby adds strength and rigidity to said finished blank. The above brief description, as well as further objects, features and advantages of the present invention, will be more fully appreciated by reference to the following detailed description of a presently preferred, but nonetheless illustrative embodiment in accordance with the present invention, when taken in conjunction with the accompanying drawings, wherein:

FIG. 1 is a plan view of a supply of expanded metal, in strip form, from which portions are removed and consumed in the production of an expanded metal product demonstrating features of the present invention, and in which figure there is also illustrated a typical product produced from one of said removed portions;

FIG. 2 is an elevational view, in section, of a two-member punch die for producing said expanded metal product of FIG. 1;

FIGS. 3–5 similarly are elevational views, in section, of said punch die of FIG. 2, in progressive stages of movement throughout a typical manufacturing cycle, to wit:

FIG. 3 is illustrative of an early position of die movement which results in the removal of an expanded metal blank from said supply strip;

FIG. 4 is illustrative of an intermediate stage of die movement resulting in a peripheral or annular section along the free edge of said blank being bent out of the plane of said blank and simultaneously confined within a chamber of said die preparatory to being crushed upon itself; and FIG. 5 is illustrative of a final stage of die movement which results in the crushing of said peripheral or annular section upon itself and the provision of a reinforced edge on said blank.

Reference is made first to FIG. 1 wherein an expanded metal blank 10 demonstrating features of the present invention is shown. Also shown in this figure is a typical supply of expanded metal 12, in strip form, from which it will be understood the finished expanded metal blank 10 is produced. In addition to expanded metal, all aspects of the present invention may also be practiced with all forms of wire mesh, and in general with any materials that are comprised as a network of metal rather than being solid throughout. Strip 12 has circular portions 14 removed from it, as evidenced by the holes 15 in the strip 12, which removed portions or work-in-process blanks 14 are employed in the manufacture of the finished blank 10. More particularly, starting with a work-in-process blank 14, the size or diameter D of which as is clearly illustrated in FIG. 1 exceeds the diameter D' of the finished blank 10, said blank 14 is processed into a finished blank 10 having a reinforced edge 16 thereon, the difference in size between the work-in-process blank 14 and the finished blank 10 being consumed in the production of said reinforced edge 16. To this end, and as will be better understood subsequently, the reinforced edge 16 is narrower in width W than the original width of an annular section or peripheral portion of said work-in-process blank 14 which is consumed in producing the edge 16, and also said edge 16 will be understood to have a thickness T (see FIG. 5) which exceeds the thickness of the central portion 10a of the finished blank 10. The central portion 10a is substantially unchanged during the production of a finished blank 10 from a work-in-process blank 14.

Reference is now made to FIG. 2 and the showing therein of an illustrative two-member punch die, generally designated 18, which is employed in the production of finished expanded metal blanks 10. The upper die member or punch holder 18a includes a body 20 having a machined main cavity 22 therein which slidably receives a spring-loaded cup forming punch 24 and a cup wall crushing punch 26. The forming punch 24, as is clearly shown in FIG. 2, is comprised of a bolt-like body 28 having threads 30 on one end, and having a larger diameter section or forming head 32 on its other end. The crushing punch 26 slidably receives the bolt body 28 in a through bore 34 and has a counter bore 36 in one end of which the forming head 32 is slidable against the urgency of a helical spring 38 disposed about the body 28 and seated against the forming head 32 and the bottom wall 40 of the counter bore 36. A washer 42 and a nut 44 are disposed on the threaded end 30 of the forming punch body 28, said nut 44 being threadably adjusted to draw-up on said body 28 so that in its normal position the forming head 32 is slightly within the opening of the counter bore 36. The crushing punch 26 is held within the main cavity 22 of the punch holder 18a by one or more machine screws 46 (only one of which is shown in FIG. 2Q and reverse sliding movement of this punch under the urgency of the spring 38 is limited by abutment of said crushing punch 26 against a heavy-duty elastomeric shock absorber 48 which advantageously is located in position by one of the machine screws 46 disposed through a through bore 50 provided in said elastomeric shock absorber 48. Completing the punch holder 18a is a cutting edge 52 machined about the end opening of a counter bore 54 of the main cavity 22.

The lower die member 18b has a body 56 similarly provided with a main cavity 58 in which a spring-loaded pad and stripping member 60 is slidably disposed. Member 60 has an upper large diameter section 62 which is slidable in a counter bore 64 of the main cavity 58, an intermediate diameter section 65, and a bolt-like terminal or lower section 66 which extends from the body 56 through a bore 67. The difference in diameter between the intermediate section 65 and the smallest diameter section 66 provides a shoulder 68 for limiting sliding movement of the member 60 into the counter bore 64. Thus, movement of member 60 into said counter bore 64 is limited to abutment of the shoulder 68 against the bottom wall 70 of said counter bore 64. This movement of the member 60 is against the urgency of a helical spring 72 which is disposed about said member 60 and seated between an annular shoulder 74 of the upper section 68 and the bottom wall 70 of the counter bore 64. Disposed on a threaded end 78 of the section 66 is a washer 80 and a nut 82, said nut 82 being threadedly adjusted to draw-up on the member 60 so that the large diameter section 62 thereof is substantially flush with a tubular extension 84 on the body 56 of the lower die member 18b. A peripheral outer edge of the extension 84 is appropriately machined into a cutting edge 86, which edge 86 in cooperation with the cutting edge 52 of the punch holder or upper die member 18a is effective to shear work-in-process blanks 14 from a supply strip 12 fed between the cooperating die members 18a, 18b.

Reference is now made to FIGS. 3–5 and to the production of a finished blank in accordance with a progressive sequence of movements of the die members 18a, 18b depicted in said figures. Assuming that said die members 18a, 18b are mounted for movement in a conventional hydraulic die press or the like, there is an initial movement of the punch holder or upper die member 18a about the tubular extension 84 of the die member 18b. This initial movement results in the isolation of or removal of a work-in-process blank 14 from the supply strip 12 as a result of the shearing action of the cooperating cutting edges 52, 84. Continued downward movement of the die member 18a about the die member 18b places the springs 40, 72 in opposition to each other, with the latter and lighter spring 72 yielding and permitting sliding movement of the member 60 within the die cavity 58 until the seating of the shoulder 68 against the bottom wall 70 of the counter bore 64 of said cavity.

As clearly shown in FIG. 4, during movement of member 60 within the counter bore 64 the head 32 of the forming punch 24 maintains a strong hold on the blank 14 against section 62 of the member 60 with the result that the movement of the work-in-process blank 14 into the smaller diameter counter bore 64 causes a forming or cupping of an annular peripheral section 88 on the blank 14 about the forming head 32. As indicated, this forming operation occurs until the seating of shoulder 68 against the counter bore bottom wall 70, at which time the annular section 88 is diagonally extended across an annular chamber 90, said chamber 90 being defined by an end 92 of the wall of counter bore 64 and the facing side wall 32a of the forming head 32, and also by the large diameter section 62 and the facing end wall 94 of the crushing punch 26.

After seating of the member 60 in the counter bore 64, continued downward movement of the upper die member 18a results in withdrawal of the head 32 within the counter bore 36 of the crushing punch 26 and movement of the end wall 94 of this punch through the chamber 90. This results in crushing of the blank peripheral or annular section 88 upon itself and the provision of a finished and reinforced edge 16 on the completed blank 10. During the final phase of movement of the downward stroke of the punch holder 18a any shock which may result from an over-stroke is absorbed by the elastomeric shock absorber 48. At the end of the cycle, the punch holder 18a is removed from about the die member 18b and the finished blank 10 ejected by the return of the member 60 to its FIG. 2 or flush position with the tubular extension 84, the two die members 18a, 18b then being in position for the next production cycle.

Returning again to FIG. 1, it will be seen that the reinforced edge 16 provided the finished blank 10, which more particularly may advantageously be used as a filter, renders said blank or filter 10 easier to handle, and by virtue of its concentrated bulk said edge 16 adds strength and dimensional stability to the product. Although the shape of the finished blank 10 as described herein is circular, it will be understood that the invention is not limited to this or any one particular shape.

A latitude of modification, change and substitution is intended in the foregoing disclosure and in some instances some features of the invention will be employed without a corresponding use of other features. Accordingly it is appropriate that the appended claims be construed broadly and in a manner consistent with the spirit and scope of the invention herein.

What is claimed is:

1. A method of manufacturing an expanded metal product or the like having a reinforced edge thereon comprising the steps of removing a blank from a supply of expanded metal or the like, bending a peripheral section along the free edge of said blank out of the plane of said blank, and crushing said section upon itself and back into the plane of said blank to form a reinforced edge on said blank.

2. A method of manufacturing an expanded metal product or the like having a reinforced edge thereon comprising the steps of removing a blank from a supply of expanded metal or the like, bending a peripheral section along the free edge of said blank out of the plane of said blank, confining said section within a chamber of lesser radial extent than said section, and crushing said section upon itself and back into the plane of said blank within said chamber to form a reinforced edge on said blank.

3. A method of manufacturing an expanded metal product or the like having a reinforced edge thereon comprising the steps of removing a blank from a supply of expanded metal or the like, bending a peripheral section along the free edge of said blank out of the plane of said blank and inwardly in relation to said free edge of said blank, confining said section within an annular chamber of lesser radial extent than said section, and crushing said section upon itself and back into the plane of said blank within said annular chamber to form a reinforced edge on said blank.

4. A method of manufacturing an expanded metal product or the like having a reinforced edge thereon comprising the steps of removing a blank from a supply of expanded metal or the like, simultaneously confining said blank to a surrounding chamber of lesser radial extent than said blank in the flat while bending a peripheral section along the free edge of said blank into said chamber, and crushing said peripheral section upon itself within said chamber to form a reinforced edge on said blank.

5. A method of manufacturing an expanded metal product or the like having a reinforced edge thereon comprising the steps of removing a blank from a supply of expanded metal or the like, holding said blank inwardly of the free edge of said blank to provide an unrestricted peripheral section along said free edge of said blank, simultaneously confining said blank to a surrounding chamber of lesser radial extent than said blank in the flat while bending said peripheral section out of the plane of said blank into said chamber, and crushing said peripheral section upon itself and back into the plane of said blank within said chamber to form a reinforced edge on said blank.

6. A blank of expanded metal or the like having a reinforced edge thereon formed by an annular section deformed inwardly in relation to the free edge of said blank, said reinforced edge being of lesser radial extent than said annular section and of a greater thickness than said blank.

7. A blank of expanded metal or the like having a body bordered by a reinforced edge formed by a peripheral section of said body deformed inwardly in relation to the free edge of said blank, said reinforced edge being narrower than said peripheral section and of a greater thickness than said body of said blank.

8. A blank of expanded metal or the like having a central section and an annular section outwardly thereof terminating in a free edge, said annular section being deformed inwardly in relation to said free edge to form a reinforced edge about said central section of lesser radial extent than said annular section and of a greater thickness than said central section.

References Cited
UNITED STATES PATENTS

| | | | |
|---|---|---|---|
| 1,984,113 | 12/1934 | Carter | 29—190 |
| 2,875,511 | 3/1959 | Hawes | 29—190 |
| 2,968,093 | 1/1961 | Lyon | 29—190 |

HYLAND BIZOT, *Primary Examiner.*

R. O. DEAN, *Assistant Examiner.*